(12) United States Patent
Goff et al.

(10) Patent No.: US 6,347,143 B1
(45) Date of Patent: Feb. 12, 2002

(54) CRYPTOGRAPHIC DEVICE WITH ENCRYPTION BLOCKS CONNECTED PARALLEL

(75) Inventors: Lonnie C. Goff, Tempe; Steven E. Cornelius, Gilbert, both of AZ (US)

(73) Assignee: Philips Electronics No. America Corp., New York, NY (US)

( * ) Notice: Subject to any disclaimer, the term of this patent is extended or adjusted under 35 U.S.C. 154(b) by 0 days.

(21) Appl. No.: 09/212,151

(22) Filed: Dec. 15, 1998

(51) Int. Cl.$^7$ ................................................ H04K 1/00
(52) U.S. Cl. ............................ 380/37; 380/28; 380/29; 380/33; 380/42
(58) Field of Search .......................... 380/28, 29, 33, 380/37, 42

(56) References Cited

U.S. PATENT DOCUMENTS

| | | | | |
|---|---|---|---|---|
| 4,100,374 A | * | 7/1978 | Jayant et al. ................. | 179/1.5 |
| 4,195,200 A | * | 3/1980 | Feistel ......................... | 178/22 |
| 5,351,299 A | | 9/1994 | Matsuzaki et al. ............ | 380/37 |
| 5,381,480 A | * | 1/1995 | Butter et al. .................. | 380/37 |
| 5,835,599 A | * | 11/1998 | Buer ........................... | 380/29 |
| 6,088,800 A | * | 7/2000 | Jones et al. ................. | 713/189 |

OTHER PUBLICATIONS

"High Performance Cryptographic Hardware using Pipelined Data Encryption Standard Units"; IBM Technical Disclosure Bulletin, vol. 38, No. 1 Jan. 1, 1995, pp. 503–507.

Eli Biham et al.; "Differential Cryptanalysis of DES–like CryptoSystems", Advances in Cryptology–Proceedings of Crypto, De, Berlin, Springer Verlag, vol. CONF. 10, 1990, pp. 2–21.

* cited by examiner

*Primary Examiner*—Albert Decady
*Assistant Examiner*—Paul E. Callahan
(74) *Attorney, Agent, or Firm*—Peter Zawilski

(57) ABSTRACT

A cryptographic device includes a de-multiplexer, a plurality of encryption blocks, a plurality of permutation blocks, and a multiplexer. The encryption blocks encrypt data to produce encrypted data. The de-multiplexer receives data portions from a plaintext message and directs the data portions to one of the encryption blocks, based on a value within a path control session key. Each permutation block is associated with an encryption block. Each permutation block permutes encrypted data from the encryption block associated therewith. The multiplexer receives data portions from each of the plurality of permutation blocks to produce an encrypted output data stream.

18 Claims, 2 Drawing Sheets

CRYPTOGRAPHIC DEVICE WITH ENCRYPTION BLOCKS CONNECTED PARALLEL

RELATED APPLICATION

The subject matter of the present invention is related to the subject matter set out by the same inventors (Steven E. Cornelius and Lonnie C. Goff) in a co-pending patent application Ser. No. 09/150,120, filed Sep. 9, 1998, for A HYBRID ONE TIME PAD ENCRYPTION AND DECRYPTION APPARATUS WITH METHOD FOR ENCRYPTING AND DECRYPTING DATA, assigned to the same assignee. The disclosure of the above-referenced application is incorporated by reference into this application.

BACKGROUND

The present invention concerns encryption/decryption of data and pertains particularly to the parallel connection of encryption blocks to enhance security and performance of cryptographic devices.

In order to protect against theft or misuse, secure information within a computing system can be encrypted before being stored within the computing system and/or transmitted to another computing system. Before a computing system uses encrypted information, the encrypted information is decrypted. For example, encryption and decryption is often performed in accordance with the Data Encryption Standard (DES). See for example, *Data Encryption Standard* (DES), Federal Information Processing Standards Publication (FIPS PUB) 46-2, Dec. 30, 1993 available from the U.S. Department of Commerce, Technology Administration, National Institute of Standards and Technology. See also *DES Modes of Operation,* Federal Information Processing Standards Publication (FIPS PUB) 81, Dec. 2, 1980 available from the U.S. Department of Commerce, National Bureau of Standards.

There are various techniques used to attack security systems. For example, in a brute-force ciphertext-only attacks, all possible combinations of keys can be tried in order to discover the plain text. Depending on the length of a secure key and other factors, an eavesdropper can, in some cases, successfully perform a DES brute-force ciphertext-only attack in a matter of hours.

Plaintext attacks (e.g. Differential Cryptanalysis) can be more efficient than brute-force attacks. In plaintext attacks, the correlation between plaintext and its resultant ciphertext is used in more clever ways than brute force attacks in order to discover the sender's key. Depending on the length of a secure key and other factors, an eavesdropper can often successfully perform some form of intelligent plaintext DES attack in 3 to 15 minutes.

It is desirable, therefore, to increase the security of information in order to make the information less vulnerable to discovery by an unauthorized user.

SUMMARY OF THE INVENTION

In accordance with the preferred embodiment of the present invention, a cryptographic device includes a de-multiplexer, a plurality of encryption blocks, a plurality of permutation blocks, and a multiplexer. The encryption blocks encrypt data to produce encrypted data. The de-multiplexer receives data portions from a plaintext message and directs the data portions to one of the encryption blocks, based on a value within a path control session key. Each permutation block is associated with an encryption block. Each permutation block permutes encrypted data from the encryption block associated therewith. The multiplexer receives data portions from each of the plurality of permutation blocks to produce an encrypted output data stream.

For example, each data portion directed by the de-multiplexer means is one byte in length. Each encryption block in the plurality of encryption blocks encrypt data eight bytes at a time.

In the preferred embodiment, two separate keys are used. An encryption session key is used to perform encryption. Different portions of the path control session key are used to control the de-multiplexer, the multiplexer and the permutation blocks.

The present invention offers significant additional protection against attacks on secrecy. Brute-force ciphertext-only attacks are greatly hindered. In a simple two encryption block system there are 12,870 different ways that the eight byte block output from one encryption block can appear in a sixteen byte transmission (i.e. combined with the eight byte output from the other encryption block). Since there are 40,320 different ways (i.e. permutations) that these eight bytes can be arranged there are, therefore, approximately 520 million combinations of ciphertext associated with a single block transmission. If an eavesdropper can successfully perform a decryption brute-force ciphertext-only attack in 3.5 hours on a single encryption block, when two encryption blocks are connected in parallel, and permutation is performed on each encryption block, it will take almost 208,000 years to perform the same attack (3.5 hours×518, 918,400 combinations=207,900 years).

Plaintext attacks on this system also get hindered by embodiments of the present invention. Since there are plaintext attacks (e.g. Differential Cryptanalysis) which can be more efficient than brute-force attacks, the correlation between plaintext and ciphertext is further obscured by adding the de-multiplexing means to the input of the encryption blocks. If an eavesdropper can successfully perform some form of intelligent plaintext encryption attack in 3 to 15 minutes on a single encryption block, when two encryption blocks are connected in parallel, and permutation is performed on each encryption block, it will take approximately 38 million years to perform the same attack (3 minutes×12870×518,918,400=38,332,900 years). Clearly, when the present invention is utilized, plaintext attacks become less efficient than brute force ciphertext-only attacks.

DESCRIPTION OF THE PREFERRED EMBODIMENT

Figure 1:
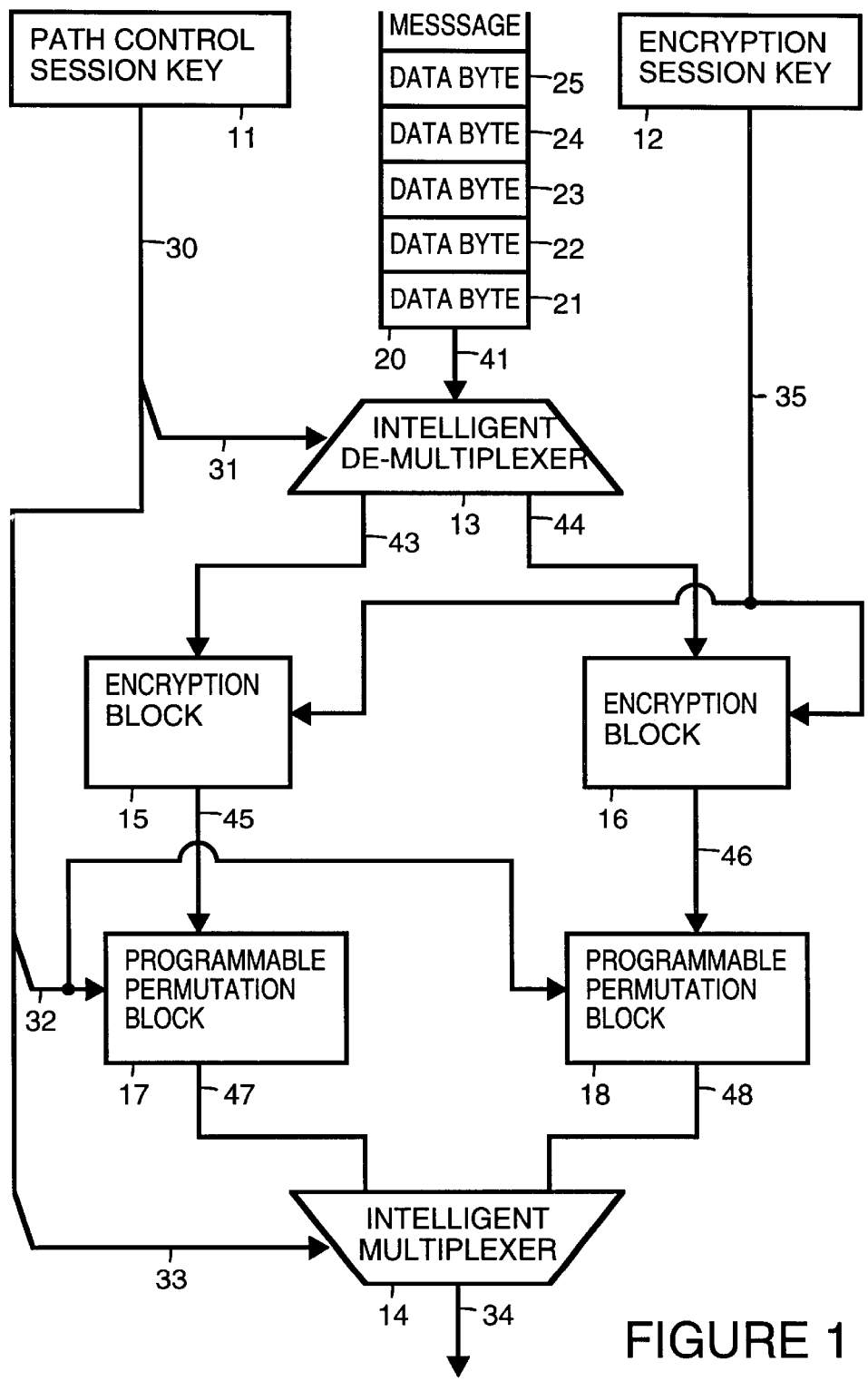
FIG. 1 is a simplified block diagram of a cryptographic device in which encryption of data and permutation of encrypted data is performed in parallel data streams for greater performance and for greater security in accordance with the preferred embodiment of the present invention.

FIG. 1 is a simplified block diagram illustrating techniques which are used to combine multiple encryption blocks for greater performance and for greater security. The techniques add to the cryptographic complexity of the system. In the preferred embodiment, the encryption blocks perform encryption/decryption in accordance with the Data Encryption Standard (DES) algorithm. However, in alternative embodiments of the present invention, other encryption algorithms may be used.

A plaintext message 20 to be encrypted includes a number of bytes, as represented by a data byte 21, a data byte 22, a data byte 23, a data byte 24 and a data byte 25. By way of an eight bit data path 41, plaintext message 20 is input into an intelligent de-multiplexer 13, one byte at a time.

A path control session key 11 is, for example 56 bits. Path control session key 11 is placed on a 56 bit data path 30. Sixteen bits of path control session key 11 are forwarded via sixteen bit data path 31 to intelligent de-multiplexer 13 to be used as a sixteen bit de-multiplexer key. The sixteen bit de-multiplexer key is used to steer each of sixteen bytes of plaintext message 20 to either an encryption block 15 via a data path 43 or an encryption block 16 via a data path 44. The first bit of the sixteen bit de-multiplexer key is used to direct the first incoming byte. If the first bit of the sixteen bit de-multiplexer key is a zero, the first byte of plaintext message 20 is passed by intelligent de-multiplexer 13 to encryption block 15. If the first bit of the sixteen bit de-multiplexer key is a one, the first byte of plaintext message 20 is passed to encryption block 16. The second bit of the sixteen bit de-multiplexer key is used to direct the second incoming byte. If the second bit of the sixteen bit de-multiplexer key is a zero, the second byte of plaintext message 20 is passed by intelligent de-multiplexer 13 to encryption block 15. If the second bit of the sixteen bit de-multiplexer key is a one, the second byte of plaintext message 20 is passed by intelligent de-multiplexer 13 to encryption block 16. And so on.

This pattern continues until encryption block 15 and encryption block 16 have each received eight bytes of the sixteen bytes of plaintext message 20. In the preferred embodiment of the present invention, the sixteen bit de-multiplexer key is edited, if necessary, so that there are an equal number of "1"s and "0"s guaranteeing that encryption block 15 and encryption block 16 each will receive eight bytes of the sixteen bytes of plaintext message 20. There are 12,870 possible ways that the sixteen bytes of plaintext message 20 can be segregated into the two byte streams.

Encryption block 15 encrypts the received eight bytes of data. The encryption is performed using an encryption session key 12 received by encryption block 15 via a data path 35. The encrypted eight bytes of data is forwarded to a programmable permutation block 17 via one byte data path 45.

Likewise, encryption block 16 encrypts the received eight bytes of data. The encryption is performed using encryption session key 12 received by encryption block 16 via data path 35. The encrypted eight bytes of data is forwarded to a programmable permutation block 18 via a one byte data path 46. Programmable permutation block 17 transposes the eight encrypted data bytes coming from encryption block 15. Programmable permutation block 17 deals with only eight bytes at a time. It takes only three bits to specify all of the transposed addresses of a single byte. Permutation block 17, therefore, requires twenty-four properly distributed address bits to perform the eight byte transposition. Likewise, Programmable permutation block 18 transposes the eight encrypted data bytes coming from encryption block 16. Permutation block 18 also requires twenty-four properly distributed address bits to perform the eight byte transposition.

Twenty-four bits of path control session key 11 are forwarded via twenty-four bit data path 32 to permutation block 17 and permutation block 18 to be used as a twenty-four bit permutation key. In the preferred embodiment, if the twenty-four bits of the permutation key used to control permutation blocks 17 and 18 are not properly distributed, the three bit addresses which would cause address collisions are edited using one-time pad techniques until all potential collisions are resolved.

More specifically, each of permutation block 17 and permutation block 18 uses eight addressable eight bit wide registers that store the information from encryption block 15 and encryption block 16, respectively. It takes three of the twenty-four bits of the permutation key to address each incoming byte. The first three bits of the twenty-four bits of the permutation key specify which register the first byte is stored in. The second three bits specify the register for the second byte. And so on.

In order to prevent multiple bytes from getting stored into the same register, each three bit segment must be unique. An edit is performed on the permutation key whenever a new key is defined (i.e. loaded). When a duplicate three bit register address is found, the three bits are changed. It is important that the algorithm that performs this modification is, itself, unpredictable. One way to implement the algorithm is to add three bits from another part of the key to the "duplicate" three bit address and check to see if the result is unique. If the result is not unique, another three bits are added and another check is made to see if the result is unique. Because the key is unknown and unpredictable, It will not be possible for an attacker to predict how duplicate addresses are fixed.

There are 8! (40,320) possible permutations generated by each of permutation block 17 and permutation block 18.

Intelligent multiplexer 14 receives eight bytes of output from permutation block 17 via an one byte data path 47. Intelligent multiplexer 14 also receives eight bytes of output from permutation block 18 via a one byte data path 48. Intelligent multiplexer 14 combines the output from permutation block 17 and the output from permutation block 18 into a sixteen byte data stream.

Sixteen bits of path control session key 11 are forwarded, via sixteen bit data path 33, to intelligent multiplexer 14 to be used as a sixteen bit multiplexer key. The sixteen bit multiplexer key is used to retrieve bytes of data from either programmable permutation block 17 via a data path 47 or programmable permutation block 18 via a data path 48. The first bit of the sixteen bit multiplexer key is used to direct the first outgoing byte. If the first bit of the sixteen bit multiplexer key is a zero, the first byte of plaintext message 20 is received by intelligent multiplexer 14 from programmable permutation block 17. If the first bit of the sixteen bit multiplexer key is a one, the first byte of plaintext message 20 is received from programmable permutation block 18. The second bit of the sixteen bit multiplexer key is used to direct the second outgoing byte. If the second bit of the sixteen bit multiplexer key is a zero, the second byte of plaintext message 20 is received from intelligent multiplexer 14 by programmable permutation block 17. If the second bit of the sixteen bit multiplexer key is a one, the second byte of plaintext message 20 is received by intelligent multiplexer 14 from programmable permutation block 18.

This pattern continues until programmable permutation block 17 and programmable permutation block 18 have each provided eight bytes of the sixteen bytes of plaintext message 20. In the preferred embodiment of the present invention, transmission control defaults to the non-empty permutation block when one of the permutation blocks is emptied. It is therefore unnecessary to edit the multiplexer key so that there are an equal number of "1"s and "0"s. There are 12,870 possible ways that the eight byte outputs from permutation block 17 and permutation block 18 can be combined into a single sixteen byte data stream.

Additionally, while the embodiment of the present invention is shown in FIG. 1 to have two parallel data streams each utilizing an encryption block and a permutation block, in alternative embodiments, more than two parallel data streams each utilizing an encryption block and a permutation block are used.

Figure 2:
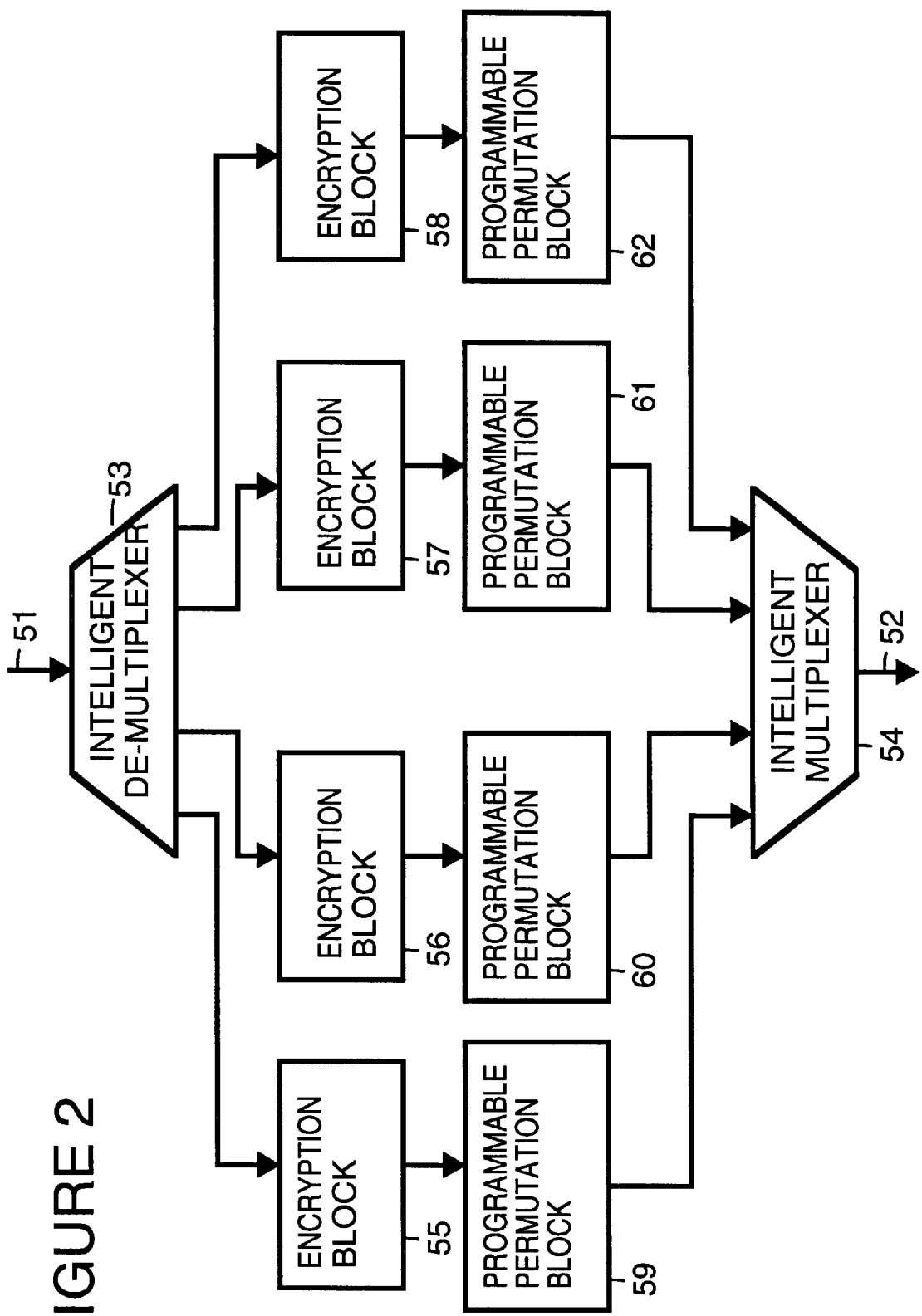
FIG. 2 is a simplified block diagram which shows a preferred embodiment of the present invention in which four parallel data streams are used for encryption of data and permutation of encrypted data.

This is illustrated, for example, by FIG. 2 which shows a simplified embodiment of the present invention which utilizes four parallel data streams.

By way of an eight bit data path 51, a plaintext message is input into an intelligent de-multiplexer 53, one byte at a time.

A portion of a path control session key (not shown) is used as a sixty-four bit de-multiplexer key. The sixty-four bit de-multiplexer key is used to steer each byte of the plaintext message to either an encryption block 55 an encryption block 56, an encryption block 57 or an encryption block 58. The first two bits of the sixty-four bit de-multiplexer key are used to direct the first incoming byte. If the first two bits of the sixty-four bit de-multiplexer key indicate a value of zero ($00_2$), the first byte of the plaintext message is passed by intelligent de-multiplexer 53 to encryption block 55. If the first two bits of the sixty-four bit de-multiplexer key are equal to a value of one ($01_2$), the first byte of the plaintext message is passed to encryption block 56. If the first two bits of the sixty-four bit de-multiplexer key indicate a value of two ($10_2$), the first byte of the plaintext message is passed by intelligent de-multiplexer 53 to encryption block 57. If the first two bits of the sixty-four bit de-multiplexer key are equal to a value of three ($11_2$), the first byte of the plaintext message is passed to encryption block 58. The second two bits of the sixty-four bit de-multiplexer key is used to direct the second incoming byte. If the second two bits of the sixty-four bit de-multiplexer key indicate a value of zero ($00_2$), the second byte of the plaintext message is passed by intelligent de-multiplexer 53 to encryption block 55. If the second two bits of the sixty-four bit de-multiplexer key are equal to a value of one ($01_2$), the second byte of the plaintext message is passed to encryption block 56. If the second two bits of the sixty-four bit de-multiplexer key indicate a value of two ($10_2$), the second byte of the plaintext message is passed by intelligent de-multiplexer 53 to encryption block 57. If the second two bits of the sixty-four bit de-multiplexer key are equal to a value of three ($11_2$), the second byte of the plaintext message is passed to encryption block 58. And so on.

This pattern continues until encryption block 55, encryption block 56, encryption block 57 and encryption block 58 have each received eight bytes of the plaintext message. In the preferred embodiment of the present invention, the sixty-four bit de-multiplexer key is edited, if necessary, so that encryption block 55, encryption block 56, encryption block 57 and encryption block 58 each will receive eight bytes of the thirty-two bytes of the plaintext message. Encryption block 55 encrypts the received eight bytes of data. The encryption is performed using an encryption session key (not shown). The encrypted eight bytes of data is forwarded to a programmable permutation block 59.

Likewise, encryption block 56 encrypts the received eight bytes of data. The encryption is performed using the encryp-tion session key. The encrypted eight bytes of data is forwarded to a programmable permutation block 60.

Encryption block 57 encrypts the received eight bytes of data. The encryption is performed using the encryption session key. The encrypted eight bytes of data is forwarded to a programmable permutation block 61.

Encryption block 58 encrypts the received eight bytes of data. The encryption is performed using the encryption session key. The encrypted eight bytes of data is forwarded to a programmable permutation block 62.

Programmable permutation block 59 transposes the eight encrypted data bytes coming from encryption block 55. Programmable permutation block 59 deals with only eight bytes at a time. It takes only three bits to specify all of the transposed addresses of a single byte. Permutation block 59, therefore, requires twenty-four properly distributed address bits to perform the eight byte transposition. Likewise, Programmable permutation block 60 transposes the eight encrypted data bytes coming from encryption block 56. Permutation block 60 also requires twenty-four properly distributed address bits to perform the eight byte transposition. Programmable permutation block 61 transposes the eight encrypted data bytes coming from encryption block 57. Permutation block 61 also requires twenty-four properly distributed address bits to perform the eight byte transposition. Programmable permutation block 62 transposes the eight encrypted data bytes coming from encryption block 58. Permutation block 62 also requires twenty-four properly distributed address bits to perform the eight byte transposition.

In order to prevent multiple bytes from getting stored into the same register, each three bit segment must be unique. An edit is performed on the permutation key whenever a new key is defined (i.e. loaded). When a duplicate three bit register address is found, the three bits are changed. It is important that the algorithm that performs this modification is, itself, unpredictable. One way to implement the algorithm is to add three bits from another part of the key to the "duplicate" three bit address and check to see if the result is unique. If the result is not unique, another three bits are added and another check is made to see if the result is unique. Because the key is unknown and unpredictable, It will not be possible for an attacker to predict how duplicate addresses are fixed.

Intelligent multiplexer 54 receives eight bytes of output from each of permutation block 59, permutation block 60, permutation block 61 and permutation block 62. Intelligent multiplexer 54 combines the output from permutation block 59, the output from permutation block 60, the output from permutation block 61 and the output from permutation block 62 into a 32-byte data stream.

Sixty-four bits of the path control session key is used as a sixty-four bit multiplexer key. The sixty-four bit multiplexer key is used to retrieve bytes from programmable permutation block 59, programmable permutation block 60, programmable permutation block 61 and programmable permutation block 62.

As can be seen by the example shown in FIG. 2, the path control session key will grow bigger as more encryption blocks are added in order to insure that all bytes from each encryption block get transmitted before the path control session key is recycled. The path control session key should be edited before it is loaded into the multiplex control register to insure that all bytes from all blocks get transmitted. For example, eight encryption blocks connected in parallel will require a 192 bit session key (three control bits/byte×eight bytes/encryption block×8 encryption blocks=192 bits).

The foregoing discussion discloses and describes merely exemplary methods and embodiments of the present invention. As will be understood by those familiar with the art, the invention may be embodied in other specific forms without departing from the spirit or essential characteristics thereof.

For example, in an alternative embodiment of the present invention key-specified permutation logic can be added to the input of encryption block 15 and encryption block 16. This would give additional protection against a plaintext attack.

Accordingly, the disclosure of the present invention is intended to be illustrative, but not limiting, of the scope of the invention, which is set forth in the following claims.

We Claim:

1. A cryptographic device comprising:
   a first encryption block for encrypting data to produce first encrypted data;
   a second encryption block for encrypting data to produce second encrypted data;
   a de-multiplexer means for receiving data portions from a message and directing the data portions to one of the first encryption block and to the second encryption block, based on a de-multiplexer key;
   a first permutation block which permutes the first encrypted data to produce first permuted data;
   a second permutation block which permutes the second encrypted data to produce second permuted data; and,
   a multiplexer means for receiving data portions from the first encrypted data and from the second encrypted data to produce an encrypted output data stream.

2. A cryptographic device as in claim 1 wherein the first encryption block and the second encryption block each use an encryption session key to perform encryption.

3. A cryptographic device as in claim 1 wherein each data portion directed by the de-multiplexer means is one byte in length.

4. A cryptographic device as in claim 1 wherein the first encryption block and the second encryption block each encrypt data eight bytes at a time.

5. A cryptographic device as in claim 1 wherein the first permutation block and the second permutation block perform permutations based on a permutation key.

6. A cryptographic device as in claim 1 wherein the multiplexer means selects an order in which the data portions from the first permutation block and the second permutation block are received based on a multiplexer key.

7. A cryptographic device comprising:
   a plurality of encryption blocks, each for encrypting data to produce encrypted data;
   a de-multiplexer means for receiving data portions from a message and directing the data portions to one of the plurality of encryption blocks, based on a de-multiplexer key;
   a plurality of permutation blocks, each permutation block being associated with an encryption block from the plurality of encryption blocks, each permutation block permuting encrypted data from the encryption block associated therewith; and
   a multiplexer means for receiving data portions from each of the plurality of permutation blocks to produce an encrypted output data stream.

8. A cryptographic device as in claim 7 wherein each encryption block in the plurality of encryption blocks uses an encryption session key to perform encryption.

9. A cryptographic device as in claim 7 wherein each data portion directed by the de-multiplexer means is one byte in length.

10. A cryptographic device as in claim 7 wherein each encryption block in the plurality of encryption blocks encrypt data eight bytes at a time.

11. A cryptographic device as in claim 7 wherein each permutation block in the plurality of permutation blocks performs permutations based on a permutation key.

12. A cryptographic device as in claim 7 wherein the multiplexer means selects an order in which the data portions from the plurality of permutation blocks are received based on a multiplexer key.

13. A method for encrypting data using a cryptographic device comprising:
    (a) receiving data portions from a message and directing the data portions to one of a plurality of encryption blocks, based on a de-multiplexer key;
    (b) encrypting data to produce encrypted data within each encryption block from the plurality of encryption blocks;
    (c) permuting encryption data from each encryption block from the plurality of encryption blocks; and
    (d) receiving data portions from each of the plurality of permutation blocks to produce an encrypted output data stream.

14. A method as in claim 13 wherein step (b) includes each encryption block in the plurality of encryption blocks using an encryption session key to perform encryption.

15. A method as in claim 13 wherein in step (a) each data portion received is one byte in length.

16. A method as in claim 13 wherein in step (b) each encryption block in the plurality of encryption blocks encrypt data eight bytes at a time.

17. A method as in claim 13 wherein in step (c) permutations are based on a permutation key.

18. A method as in claim 13 wherein step (d) includes selecting an order in which the data portions from the plurality of permutation blocks are received based on a multiplexer key.

\* \* \* \* \*